J. G. McDONOUGH.
LUMBER BRANDING AND REBRANDING MACHINE FOR PLANING MILLS AND ROLLER BEDS.
APPLICATION FILED JULY 31, 1916.

1,340,967.

Patented May 25, 1920.
3 SHEETS—SHEET 1.

WITNESSES

INVENTOR
JOSEPH G. McDONOUGH
BY
ATTORNEYS

J. G. McDONOUGH.
LUMBER BRANDING AND REBRANDING MACHINE FOR PLANING MILLS AND ROLLER BEDS.
APPLICATION FILED JULY 31, 1916.

1,340,967.

Patented May 25, 1920.

3 SHEETS—SHEET 2.

WITNESSES
M. R. McInnis
E. A. Paul

INVENTOR
JOSEPH G. McDONOUGH
BY Paul & Paul
ATTORNEYS

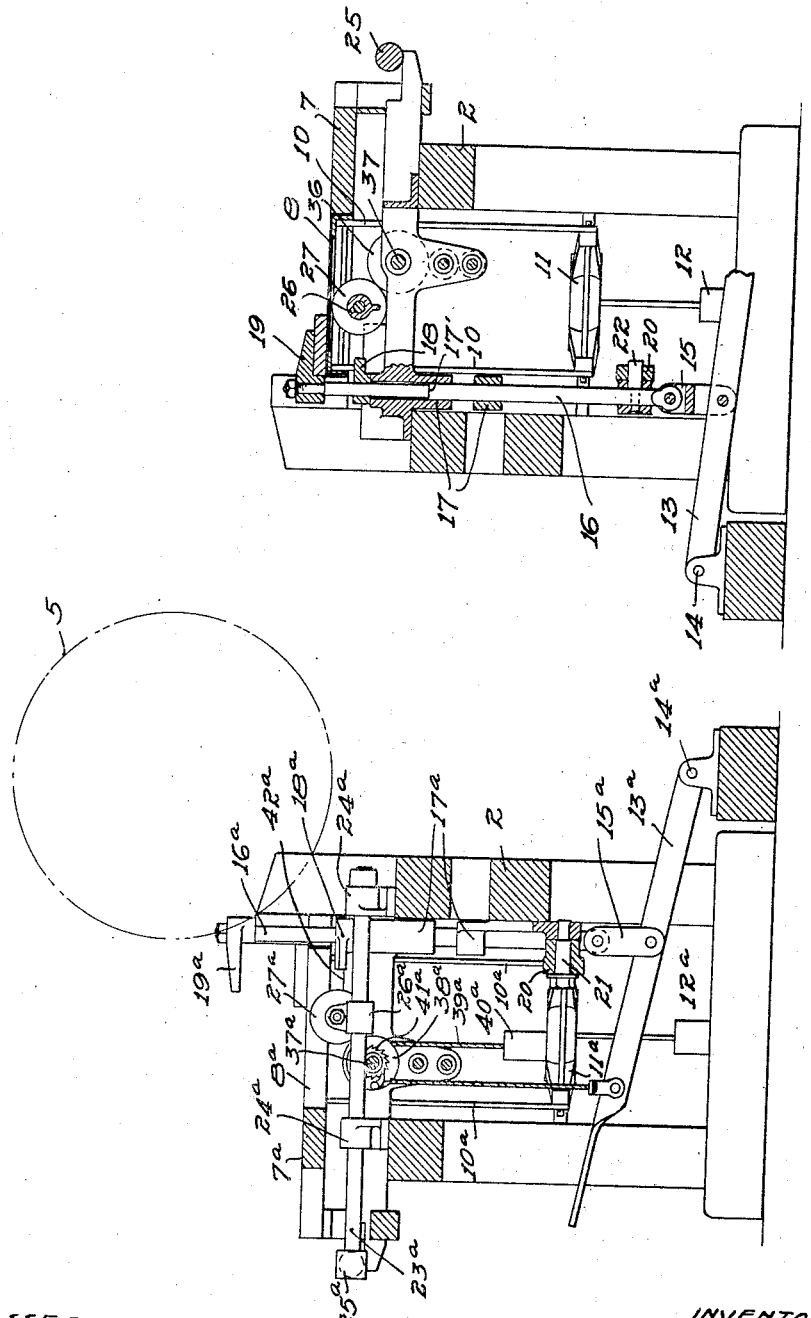

UNITED STATES PATENT OFFICE.

JOSEPH GILBERT McDONOUGH, OF EAU CLAIRE, WISCONSIN.

LUMBER BRANDING AND REBRANDING MACHINE FOR PLANING-MILLS AND ROLLER-BEDS.

1,340,967.  Specification of Letters Patent.  Patented May 25, 1920.

Application filed July 31, 1916. Serial No. 112,418.

*To all whom it may concern:*

Be it known that I, JOSEPH G. McDONOUGH, a citizen of the United States, resident of Eau Claire, county of Eau Claire, State of Wisconsin, have invented certain new and useful Improvements in Lumber Branding and Rebranding Machines for Planing-Mills and Roller-Beds, of which the following is a specification.

It frequently happens that dressed and dried lumber and timber will disclose checks or other imperfections and necessitate trimming the ends or cutting a piece of lumber in two or more parts which had previously been branded at the saw mill. This re-trimming or cross cutting usually eliminates the original brand and the present object of my invention is to provide a machine by means of which dressed or re-trimmed lumber may be branded or re-branded.

Other objects of the invention will appear from the following detailed description.

The invention consists generally in various constructions and combinations, all as hereinafter described and particularly pointed out in the claims.

Figure 1:
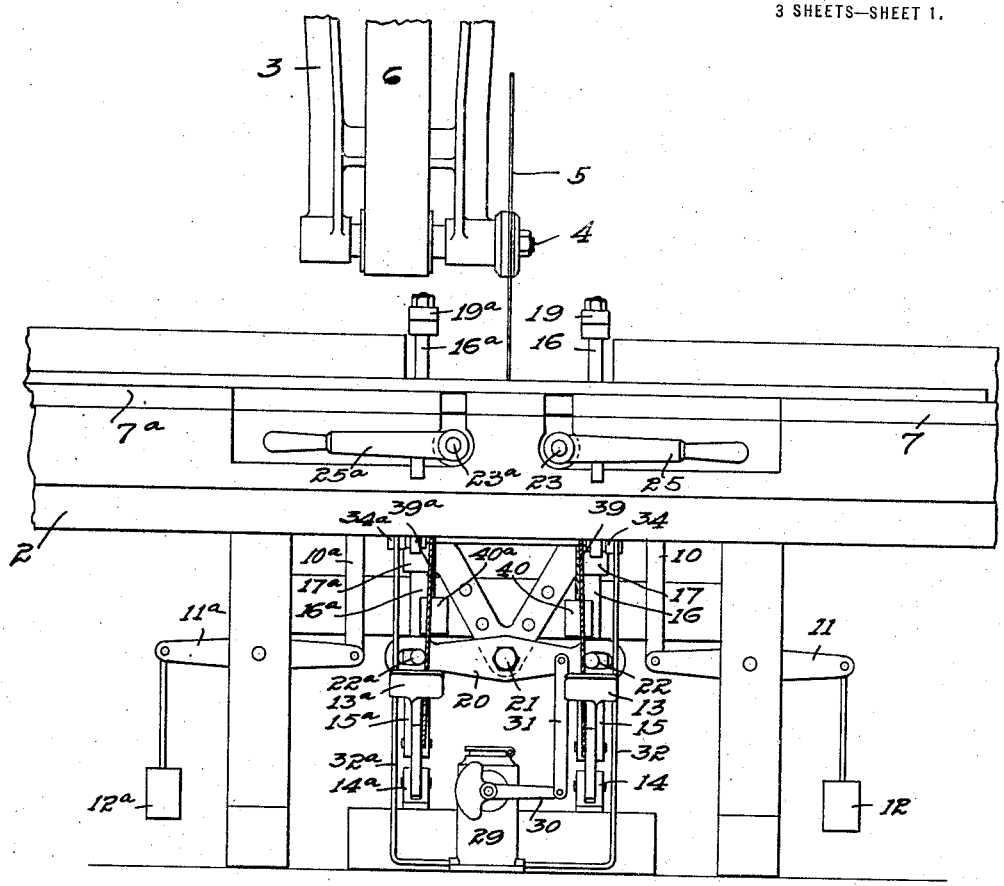
Figure 6:
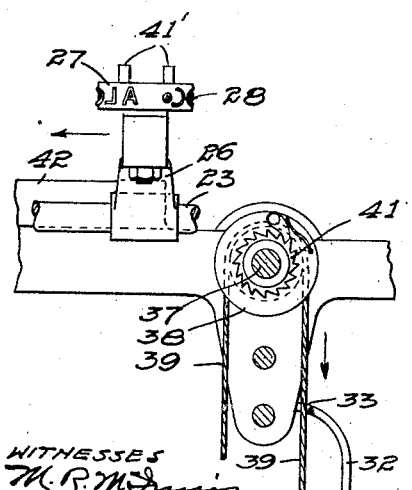
Figure 7:
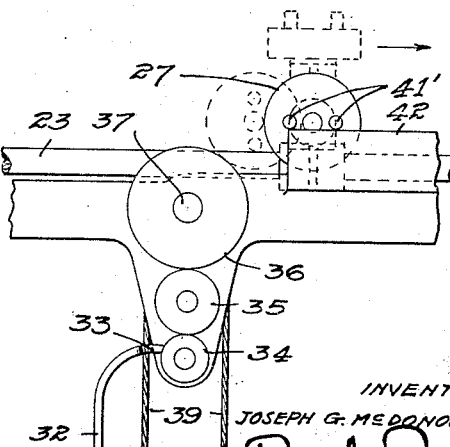
Figure 2:
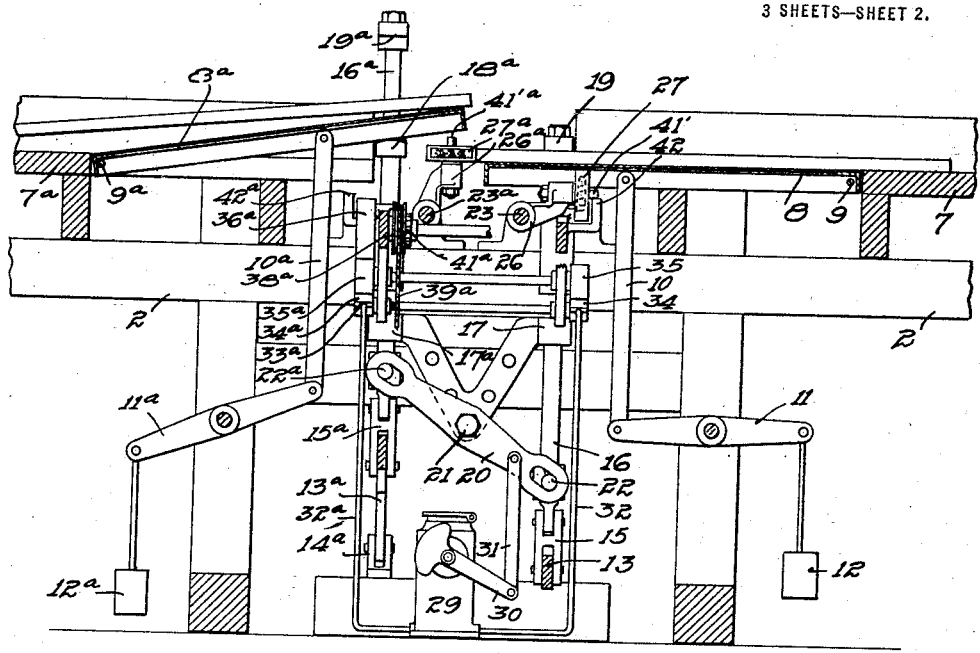
Figure 3:
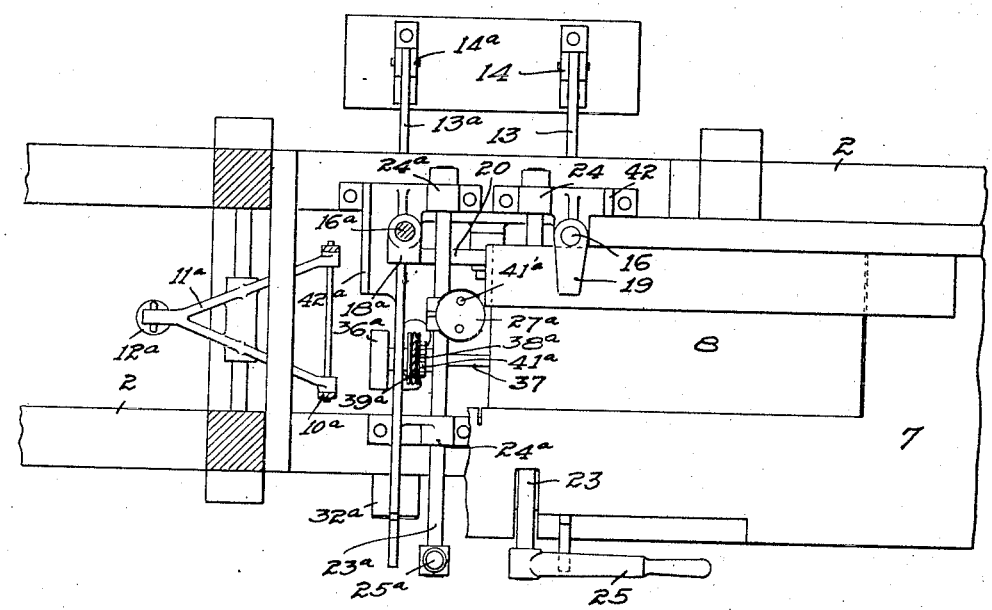

In the accompanying drawings forming part of this specification,

Figure 1 is an elevation of a branding or re-branding machine embodying my invention, Fig. 2 is a vertical sectional view of the same, showing the position of the parts in the operation of re-branding a piece of lumber, Fig. 3 is a plan view, Fig. 4 is a transverse sectional view, showing one of the lumber carrying tables and the mechanism for raising it to separate the abutting ends and permit branding of the piece of lumber on the adjacent table, Fig. 5 is a similar view, looking in the opposite direction, showing the clamp device for gripping the piece of lumber while it is being branded, Figs. 6 and 7 are detail views of the inking mechanism for the branding wheel.

In the drawing, 2 represents the frame of the machine, above which is a hanger 3 supporting a saw arbor 4 and the trimmer saw 5 driven through a belt 6. Beneath the saw is a platform 7 on which the lumber is supported and in said platform I arrange tilting tables 8 placed end to end, hinged at 9 to the platform and forming substantially a continuation thereof, the abutting ends of the tables being free to move vertically to raise the end of one piece of lumber out of alinement with the other piece or to provide room for the branding device. These tables, the branding wheels and the operating mechanism therefor are substantially the same in construction and operation and I will designate them by the same reference numerals, with the addition of the exponent "a," and I will describe the construction and operation of one mechanism, it being understood that the other operates in a similar manner.

A link 10 is attached to the table 8 and to a lever 11 pivoted intermediate to its ends on the frame and having a counter balance 12 of sufficient weight to substantially offset the weight of the table and facilitate lifting the same. 13 is a treadle lever, pivoted at 14 and pivotally connected by a link 15 with the lower end of a rod 16 that is slidable in guides 17 on the frame. The rod 16 has a shoulder 17' positioned to contact with a collar 18 that projects under the table 8 for raising it and separating the piece of lumber thereon and the upper end of the rod 16 is provided with an arm 19 which overhangs the table 8 and the piece of lumber so that when the treadle lever 13 is forced downwardly this arm will bear on the piece of lumber and clamp it securely on the table. A walking beam 20 is pivoted at 21 on the frame and has a slot and pin connection at 22 with the rod 16 to be drawn down at that point when said rod is depressed and the opposite end of the beam 20 has a similar connection with the rod 16$^a$ to elevate it and its connections on the downward movement of the rod 16. This operation of the treadle has therefore the effect of clamping the piece of lumber on one table preparatory to the branding operation and raising the other table and the lumber out of the path of the branding wheel. Should it be desired to brand the piece of lumber on the table 8 then the treadle lever 13$^a$ will be depressed and the operation described will be reversed; that is, the rod 16 will be raised and with it the table 8, while the rod 16$^a$ will be depressed to clamp its lumber on the table 8$^a$.

Beneath the tilting end of the table 8 is a shaft 23 mounted transversely of the machine in bearings 24. This shaft is provided with an operating lever 25 and is free to rock in said bearings and also has an axial movement therein. Upon this shaft a bracket 26 is secured and a branding wheel 27 is mounted on said bracket to rock with said shaft and also revolve on its axis. This wheel is provided on its peripheral face with branding marks or characters 28, preferably repeated on the surface of the wheel to provide for a succession of marks on the end of the piece of lumber, and the brands will, of course, designate the mill in which the lumber was dressed or manufactured and from which it was shipped to the builder or dealer. Normally, this branding wheel, with its bracket, will lie in an inoperative position beneath its table, but when one of the tables is raised, sufficient space is provided for the branding wheel beneath that table to be swung upwardly so that the wheel is in a horizontal plane and positioned to contact with the end of the piece of lumber on the abutting table. This lifting movement is accomplished by the operator grasping the lever 25 and rocking the shaft in its bearing until the branding wheel has assumed a substantially horizontal position in the plane of the piece of lumber to be marked. When this position has been assumed the operator will press inwardly on the shaft, sliding it in its bearing 24 and causing the wheel to roll on the end surface of the lumber.

It is desirable in an apparatus of this kind to provide means for inking the printing wheel to insure the legible reproduction of the brand on the end of the lumber. With this end in view I provide an ink pump 29 having a crank arm 30 connected by a link 31 with the walking beam 20. The base of this pump communicates with pipes 32 and 32ᵃ, the former leading to a nozzle 33 adjacent to a roll 34 which contacts with a similar roll 35 for delivering the ink to a larger roll 36. These rolls are supported in the frame of the machine and the roll 36 has a shaft 37 and a sheave 38 provided with a cable 39, one end of which is attached to the lever 13 and the other end is provided with a counter-weight 40. A ratchet 41 connects the sheave 38 with the shaft 37. The roll 36 is in the path of the printing wheel 27 and operates to ink this roll when it is pushed inwardly preparatory to swinging it to a horizontal position to brand the lumber.

The printing wheel is preferably provided with pins 41′ to contact with a guide 42 which operates to rotate the printing wheel on its bearing and adjust the dies in proper position to brand the end of the lumber.

In the operation of the machine, a piece of lumber having been re-trimmed, the attendant will depress a treadle and thereby raise one of the tables and separate the piece of lumber thereon, as indicated in Fig. 2, and expose the trimmed end of the other section of lumber. The shaft bearing the printing wheel will then be operated to bring the wheel into contact with the inking roll to apply ink to the dies on the printing wheel. When this has been done, the shaft is rocked on its axis and the printing wheel thrown to an upright position, where it will stand in a plane in alinement substantially with the plane of the piece of lumber to be branded. The attendant will then move the supporting shaft inwardly and cause the wheel to roll across the end surface of the lumber and brand or re-brand the same. The other piece of lumber, assuming that it has been cross-cut, may be marked in a similar manner by operating the mechanism actuated through the other treadle and the other printing wheel supporting shaft.

Rolls may be substituted for the table 7, if desired, when cutting and trimming heavier lumber or timber.

The device may be made in various sizes and the details of construction herein may be modified in various ways and still be within the scope of my invention.

I claim as my invention:

1. The combination, with a lumber or timber supporting table composed of sections arranged end to end and mounted for movement out of alinement with each other, of means for clamping transversely severed pieces of lumber on said table sections, means for moving one section and the lumber thereon to expose the lumber on the other section, and means for applying a mark or impression to the piece of lumber or timber so exposed.

2. The combination, with a lumber supporting table composed of hinged sections arranged end to end, means for clamping transversely severed pieces of lumber upon said table sections and means for applying a mark or impression to one piece of lumber when the other piece and its supporting table section have been moved out of alinement therewith.

3. The combination, with a lumber supporting table composed of inlependently movable sections and means for moving one section out of alinement with the other section, means for holding pieces of lumber on said table sections and means for applying a mark or impression to either of said pieces of lumber, when the other piece has been moved out of alinement therewith.

4. The combination, with a lumber supporting table transversely divided into independently movable sections for adjustment into or out of alinement with each other, means for holding pieces of lumber upon said table sections and means for applying a mark or impression to a vertical end surface of either of said pieces of lumber when the other piece has been moved out of alinement therewith.

5. The combination, with means for moving severed pieces of lumber or timber out of alinement with one another to expose their abutting ends, of means operating under one severed piece for making a mark or impression upon the exposed end surface of the other piece.

6. The combination, with means for separating the abutting severed ends of pieces of lumber or timber, of a marking die mounted for manual movement across the end surface of a piece of lumber so separated.

7. The combination, with means for supporting severed pieces of lumber in alinement with one another with abutting end faces, of means for moving said abutting ends out of alinement with one another to expose the severed ends, and means operating transversely of the lumber for making a mark or impression on the abutting end surfaces of either or both pieces.

8. The combination, with a lumber or timber supporting means, of a marking die having an initial rotary movement and a subsequent horizontal movement across the surface of the lumber or timber to be marked.

9. The combination, with means for separating the abutting severed ends of pieces of lumber or timber, of marking dies mounted for manual movement across the end surfaces of said pieces and means for inking said dies.

10. The combination, with a lumber or timber supporting means, of a marking die having an initial rotary movement and a subsequent horizontal movement across the end face of the lumber or timber to be marked, and means for inking said die.

11. The combination, with a lumber supporting table composed of independently movable sections and means for clamping pieces of lumber thereon, of a marking die having a rotary and a horizontal movement across the surface of the lumber or timber to be marked.

12. The combination, with a lumber or timber supporting table divided into independently movable sections and means for moving one section out of alinement with the other section, of means for holding pieces of lumber or timber on said sections and a marking die mounted for manual movement across the end surfaces of said pieces of lumber or timber.

13. The combination, with a lumber supporting table, of a shaft having a rotary and an axial movement, a die carried by said shaft, the rotary movement of said shaft adjusting said die in the plane of the lumber and the axial movement of said shaft applying said die to the surface of the lumber.

14. The combination, with a frame, of lumber supporting tables mounted end to end therein, each table having a movement to a position out of alinement with the other table and a branding device mounted to mark the lumber on one table when the other table and its lumber has been moved out of alinement therewith.

15. The combination, with a lumber supporting table, of a shaft having a rotary and an axial movement, a branding wheel carried by said shaft, means for inking said wheel, the rotary movement of said shaft adjusting said wheel in the plane of the lumber and the axial movement of said shaft applying the peripheral surface of said wheel to the surface of the lumber.

16. The combination, with a frame, of lumber supporting tables mounted end to end therein and having freedom of vertical movement to allow the end of a piece of lumber to be raised above the abutting end of a severed section, and a branding wheel mounted to move into the space beneath the raised table for applying a brand to the section of lumber on the other table.

17. The combination, with a frame, of lumber supporting tables mounted therein, means for raising either one of said tables independently of the other one to elevate a section of lumber above a severed section, and mechanism for branding the surface of one of the pieces of lumber on said tables.

18. The combination, with a frame, of lumber supporting tables hinged at one end therein in alinement substantially with one another and having freedom of independent vertical movement at their abutting ends, mechanism for raising said tables independently of one another, and means operating to brand the surface of a piece of lumber on one table when the other table and the lumber thereon is raised.

19. The combination, with means for separating the abutting severed ends of pieces of lumber or timber, of a marking die mounted to move across the end surface of a piece of lumber so separated.

20. The combination, with a lumber supporting table and means for clamping a piece of lumber or timber thereon, of a die mounted to move transversely of the lumber on said table and mark a vertical surface thereof.

21. The combination, with a lumber supporting table and means for holding a piece of lumber or timber thereon with an exposed transversely severed end surface, and means moving transversely of the lumber for applying a brand or mark to said exposed surface.

22. The combination, with a lumber supporting table and means for holding a piece of lumber or timber thereon with an exposed transversely-severed end, and a marking wheel mounted for movement transversely of said severed end for applying a mark or impression thereto.

23. The combination, with a lumber or timber supporting means, of a marking die having an initial rotary movement and a subsequent horizontal movement across the surface to be marked.

In witness whereof I have hereunto set my hand this 20th day of July, 1916.

JOSEPH GILBERT McDONOUGH.